N. W. McLEOD.
APPARATUS FOR FORMING AND VULCANIZING RUBBER ARTICLES.
APPLICATION FILED AUG. 2, 1913.
1,118,503.
Patented Nov. 24, 1914.
2 SHEETS—SHEET 2.
Fig. II.
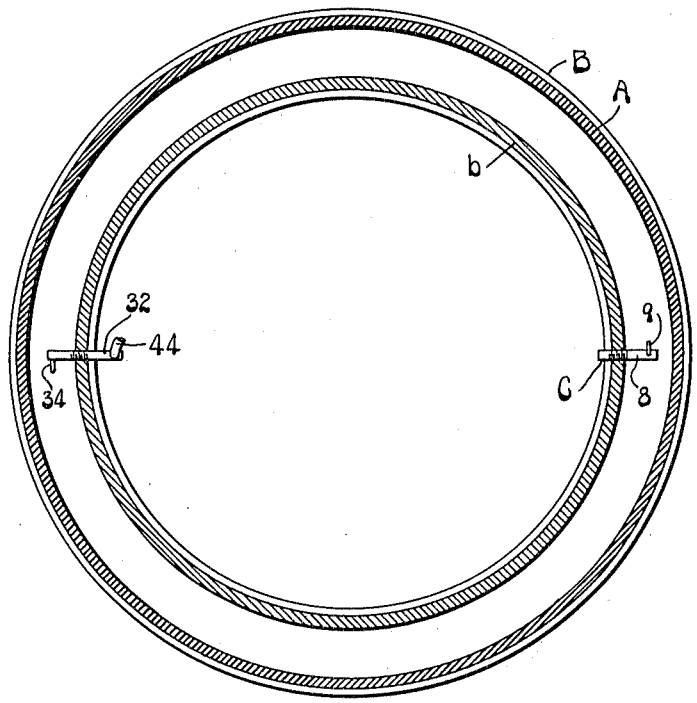
Fig. III.
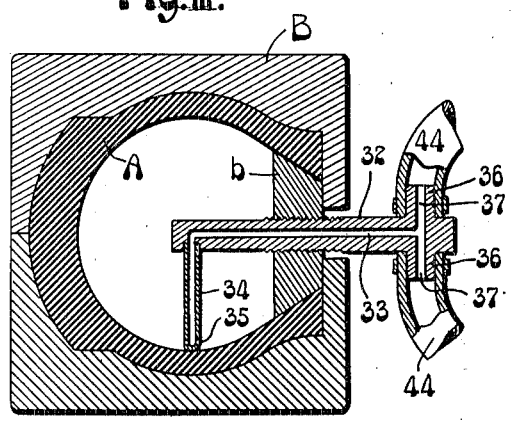
Fig. IV.
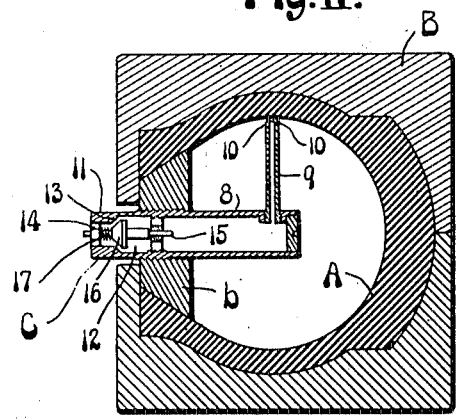
Attest
A. J. McCauley
E. B. Finn
Inventor:
N. W. McLeod
by Knight & Cook
Attys

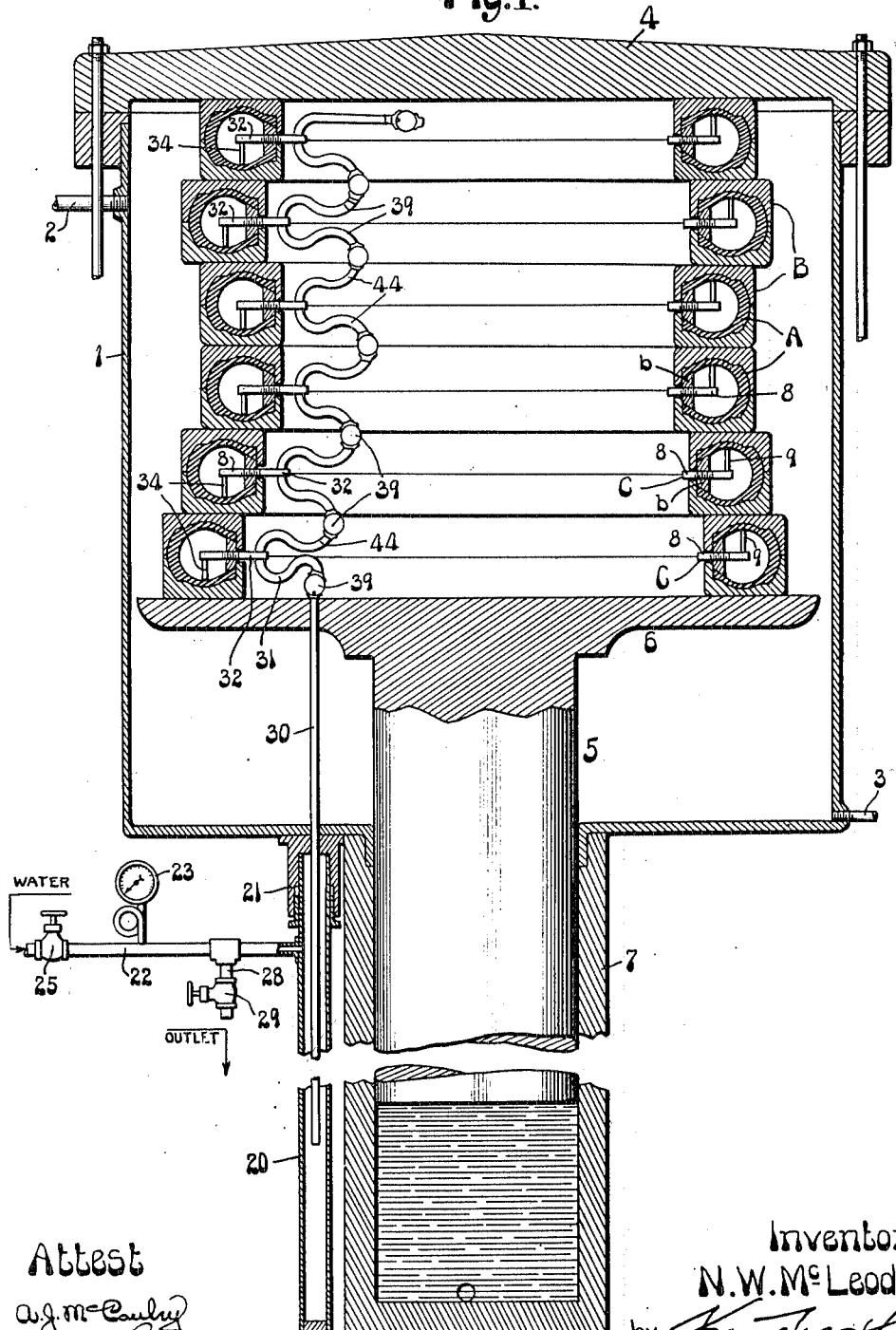

UNITED STATES PATENT OFFICE.

NELSON W. McLEOD, OF ST. LOUIS, MISSOURI, ASSIGNOR TO THE AMERICAN TIRE COMPANY, OF ST. LOUIS, MISSOURI, A CORPORATION.

APPARATUS FOR FORMING AND VULCANIZING RUBBER ARTICLES.

1,118,503.  Specification of Letters Patent.  Patented Nov. 24, 1914.

Application filed August 2, 1913.  Serial No. 782,623.

*To all whom it may concern:*

Be it known that I, NELSON W. McLEOD, a citizen of the United States of America, and a resident of the city of St. Louis and State of Missouri, have invented certain new and useful Improvements in Apparatus for Forming and Vulcanizing Rubber Articles, of which the following is a full, clear, and exact description, reference being had to the accompanying drawings, forming a part of this specification.

My invention relates to an apparatus for use in forming and vulcanizing rubber articles, the apparatus being designed more particularly for use in forming and vulcanizing hollow rubber tires, the structures of which comprise rubber compounds, and fabric for reinforcing the rubber compounds.

My invention relates more particularly to certain specific improvements in that construction of apparatus for forming and vulcanizing rubber articles which comprises a vulcanizer pot, a mold the parts of which are pressed together within the vulcanizer pot, and means for conducting fluid from the exterior of the vulcanizer pot to the cavity of the mold.

My improvement consists in an improved fluid receiver on the exterior of the vulcanizer pot, which is connected with the cavity of the mold.

My improvement consists further in an improved construction of the fluid conductor connection.

My improvement consists further in an improved construction of nozzle for connecting the fluid conducting pipe with the mold cavity.

My improvement consists further in an improved construction of automatic valve device located between the cavity of the mold and the chamber of the vulcanizer pot.

Figure I is a vertical section of my apparatus. Fig. II is in part a plan view of one of the sections of one of my molds, and the fluid conductor connections entering the mold, and in part a section of the abutment ring of the mold and a tire in the mold. Fig. III is an enlarged cross section through one of my molds and the fluid conductor connection leading thereinto. Fig. IV is an enlarged cross section through one of my molds and the automatic valve device providing communication between the cavity of mold and the chamber of the vulcanizer pot.

In the drawings, I have illustrated my apparatus of preferred construction, with the article to be treated shown as a rubber tire, designated A, the tire having two edges at its inner circle and being built up of fabric and rubber compound, in accordance with the usual practice in making hollow tires of the pneumatic tire type. The tires A are incased within suitable sectional molds B, each mold including, in addition to shell sections, an abutment ring $b$, which is situated between the edges at the inner circle of the tire when the built up raw tire is placed within the mold, to remain in such position throughout the treatment of the tire. The abutment ring, by its position between the edges of the tire, permits of the tire edges being tightly clamped between said abutment ring and the shell sections of the mold to produce fluid tight joints, in order that fluids introduced into the tire occupying the mold cavity, may be retained therein for the treatment of the tire. Fluids are delivered into the tires by means which will be hereinafter fully described.

1 designates a vulcanizer pot, through which steam is circulated, the pot, with this object in view, having connected to it pipes 2 and 3, one of which serves to admit live steam to the pot and the other of which allows the steam to escape from the pot. The vulcanizer pot has a closure 4, which may be held in closed position by any suitable means, access to the pot being permitted by moving, either the body of the pot or the closure relative to the other part of the pot.

5 designates a mold moving means in the form of a hydraulic ram provided with a head or table 6, the latter being situated within the vulcanizer pot and being movable therein. The ram head 6 serves as a support for the molds B, and upon the movement of the ram and its head toward the opposing closure 4, the pressure exerted upon the sectional molds B causes the tires therein to be clamped within the molds between the mold sections and the abutment ring $b$ to such degree as to render the joints of the mold fluid tight. Steam admitted into the vulcanizer pot is, therefore, excluded from the molds, except through means to be hereinafter described. The hydraulic ram 5 is operable in a cylinder 7, into which water or other fluid is introduced.

I next come to a description of the means by which fluids are conducted into the molds B, for the purpose of first fully expanding and compressing raw tires in said molds and, thereafter, vulcanizing the interior portions of the tires, while the exterior portions of the tires are being vulcanized from heat transmitted through the mold shells. It will, however, facilitate the description to first describe an automatic valve device C, by which communication is established between the interiors of each mold and the vulcanizer pot to, at one time vent air from the mold while another fluid is being delivered into the mold, and at another time admit steam into the mold from the pot to facilitate discharge of fluid contents of the mold. This valve device C comprises a tube 8 which extends through the abutment ring of the mold, the said tube being provided at its inner end with a pipe 9 extending upwardly therefrom in the mold cavity so that its upper end terminates in proximity to the inner face of the tire A, the pipe 9 having in its wall, near its upper end, apertures 10 which provide for the pipe receiving fluid contents of the tire at the greatest elevation therein, or admitting fluid into the tire at the same point. At the outer end of the tube 8 is a valve casing 11, containing a valve chamber 12, in which is a valve seat 13. Extending through the outer end of the valve casing 11 is a duct 14, which communicates with the vulcanizer pot 1. A valve stem 15 carrying a valve 16 is operable in guides in the valve casing and a light spring 17 tends to hold the valve from its seat when only air is present in the tube 8 and the tire in the mold.

As previously mentioned, I provide in my apparatus for delivery of fluid to the interiors of the molds housed within the vulcanizer pot, to first expand the tires therein outwardly to the walls of the mold cavities and compress the rubber compounds of the tires, and after withdrawing the fluid utilized for this purpose, introduce into the molds a vulcanizing fluid. The introduction of these fluids into the molds and the draining of fluids from the molds is accomplished by fluid conducting means of which a description will now be given.

20 designates a fluid receiver located exteriorly of the vulcanizer pot, the receiver being preferably in the form of a tube extending in the line of travel of the hydraulic ram 5, and having a closed lower end. The fluid receiver 20 is preferably attached to the vulcanizer pot in a suspended position by a socket and flanged collar coupling 21, through which and the vulcanizer pot, a fluid conducting pipe, to be hereinafter more particularly referred to, operates. Water is delivered under pressure to the receiver 20, through a pipe 22, which is supplied with a gage 23. The pipe 22 is provided with a cut off valve 25. The water delivered through the pipe 22 is forced therethrough under pressure derived by any suitable means, such, for example, as a pump, (not shown). The pipe 22 has connected to it a drain pipe 28, which is supplied with a cut off valve 29.

30 designates the previously mentioned fluid conducting pipe extending from the fluid receiver 20 into the vulcanizer pot 1. This pipe 30 is connected to the head of the ram 5 and is carried with said ram in its movements. The pipe is open at its end located within the fluid receiver 20 and, as it reciprocates in said receiver, there is constant communication between the pipe 30 and the receiver. The pipe 30 is provided at its upper end with a pipe coupling member 39.

31 designates a fluid conducting pipe of a flexible manifold of serpentine shape having a coupling member 39, which is attached to the coupling member 39 on the pipe 30 to place the conducting pipe 31 in communication with the conducting pipe 30 operable in the fluid receiver 20. The conducting pipe 31 is located above the ram head, and is preferably flexible.

32 designates nozzles arranged in and extending through the abutment rings b of the molds B, each nozzle having a longitudinal duct 33 therein, which is of less diameter than the internal diameters of fluid conducting pipes fitted to the nozzles exteriorly of the molds. The nozzles 32 extend to the cavities or interiors of the molds to such degrees as to provide for pipes 34 attached thereto at their inner ends being located at approximately the centers of the cavities within the tires confined in the molds. The pipes 34, which extend downwardly and rest upon the inside faces of the confined tires, have apertures 35 in their walls near their lower ends. The nozzles 32 are provided externally of the molds with nipples 36, having ducts 37 therein, communicating with the longitudinal ducts in the nozzles.

44 designates flexible fluid conducting pipes attached to nipples of the nozzles 32, by which communication is established between a series of molds used in my apparatus, the said pipes being provided with connecting coupling members 39. The couplings comprising said members are preferably of the well known air brake coupling type. The conducting pipe 31 in communication with the conducting pipe 30 is fastened to one of the nipples of the nozzle 32 of the mold next adjacent to the ram head 6, and fluid passing through the pipe 31 is delivered to said nipple to pass through the nozzle to the interior of the tire confined within said mold. It is also to be noted that the fluid will pass to the second nipple of the nozzle and enter the first conducting pipe 44. From the last mentioned pipe the fluid enters the nozzle 32 associated with the second mold and partakes of flow in the two directions similar to that it partook of at the first nozzle. Flow of fluid is thus continued throughout the entire series of molds connected in series by the pipes 44.

I claim:—

1. A vulcanizer apparatus comprising a vulcanizer pot, mold moving means in said pot, a mold movable by said mold moving means, a fluid conducting pipe in communication with said mold carried by said mold moving means, and a fluid receiver in which said conducting pipe reciprocates during the movement of said mold moving means, said fluid conducting pipe being in constant communication with the fluid receiver.

2. A vulcanizing apparatus comprising a vulcanizer pot, a ram in said pot, a mold carried by said ram, a fluid conducting pipe in communication with said mold carried by said ram, and a fluid receiver in which said fluid conducting pipe reciprocates during the movement of said ram, said conducting pipe being in constant communication with said receiver.

NELSON W. McLEOD.

In the presence of—
E. CLARK,
E. B. LINN.